Jan. 1, 1957 J. V. DANIELS 2,776,364
PHOTOGRAPHIC FLASH APPARATUS
Filed June 27, 1955 2 Sheets-Sheet 2
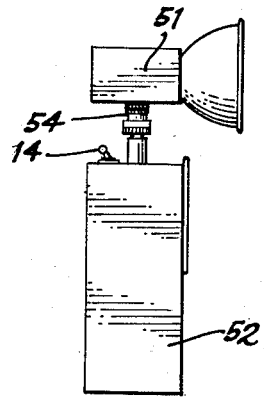
FIG. 6
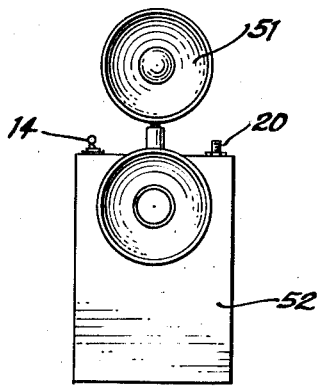
FIG. 7
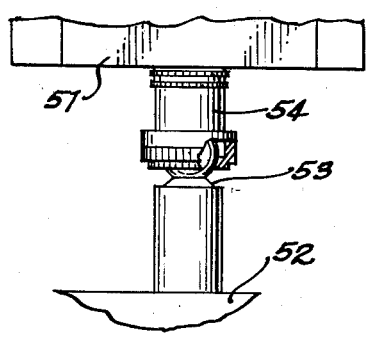
FIG. 9
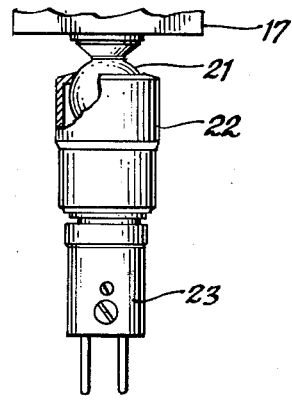
FIG. 8
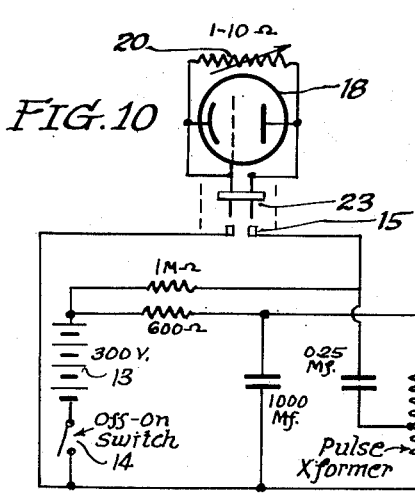
INVENTOR.
James V. Daniels
BY Ooms, McDougall,
Williams & Hersh
Attorneys

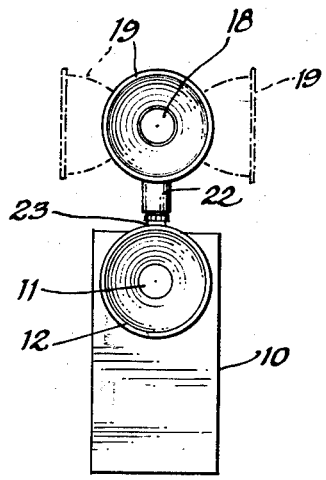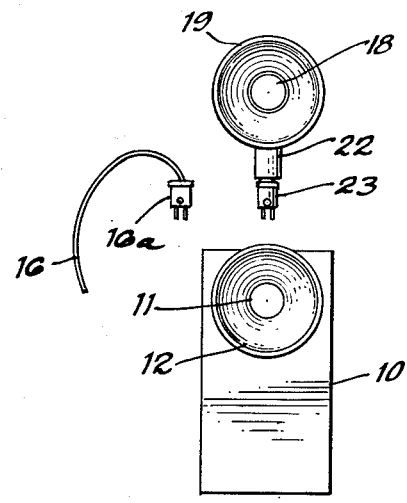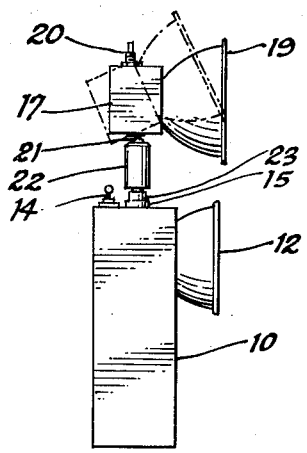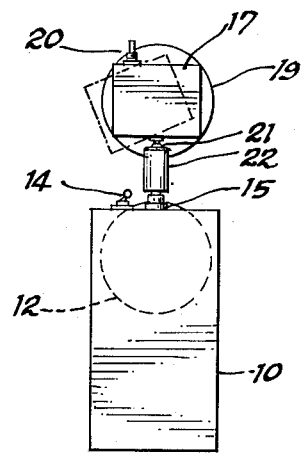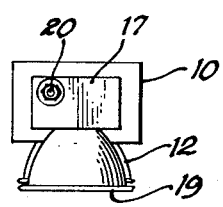

United States Patent Office 2,776,364
Patented Jan. 1, 1957

2,776,364

PHOTOGRAPHIC FLASH APPARATUS

James V. Daniels, Skokie, Ill., assignor to Kemlite Laboratories, Chicago, Ill., a partnership Application June 27, 1955, Serial No. 518,015

2 Claims. (Cl. 240—1.3)

This invention relates to the field of photographic flash apparatus, and is in particular addressed to a novel improvement in flash apparatus of the type wherein a flash is produced in a gaseous-discharge tube by suddenly discharging therethrough the electric charge stored in a capacitor.

Devices of that type have been known for a number of years and are in wide use. My invention does not relate broadly to such apparatus, but is rather addressed to an improvement in flash equipment of the type in which a flash is produced responsively to a primary flash from an outside source. These devices are sometimes called "slave units," a name suggested by their characteristic of producing flashes only in response to a primary or master flash. In one form of my invention I provide equipment which may be used either as a primary light source actuated by a switch synchronized with the camera shutter or as a slave unit.

The major application of slave units in photography has been to avoid the effect of "flatness" resulting from having the light source and the camera in the same plane, and to achieve special lighting effects desired by photographers and not obtainable from a single flash unit.

Broadly speaking, my invention consists in providing a flash unit having both a light-responsive trigger element and a gaseous-discharge flash tube, each of such elements being associated with a light-focusing device and being connected together through a universal joint permitting free choice of relative positions of the light-sensitive unit and the flash tube.

Units constructed according to my invention have proved to be capable of faithful "slave" operation at distances far beyond the effective range of prior-art slave units; successful operation at distances as great as sixty to seventy feet may be expected from my invention.

Further, my invention has achieved far greater flexibility and versatility with regard to placement of the slave unit and consequent distribution of light on the photographic subject than has ever been possible with prior-art equipment. This advantage is highly important in connection with photography requiring artistic lighting, such as in the photographing of stage scenes, group gatherings, etc.

In one particularly useful form of my invention, I have provided a means by which an ordinary photographic flash unit of the sort normally operated by a camera shutter switch can be converted at will into a slave unit having all the advantages of my invention. This result I accomplish by means of an accessory comprising a light-sensitive trigger tube, a light-focusing collector, and a universal joint, mounted on a socket adapted to be received by the flash unit in place of the plug normally used for connecting the flash unit to the shutter switch of the camera.

In the foregoing paragraphs I have summarized several of the more important objects and advantages of my invention. From the following detailed description of certain embodiments of my invention, other objects and advantages will appear.

In the drawing which is appended hereto, Figure 1 shows a plan view of an embodiment of my invention adapted to be assembled from a conventional photographic flash unit. Fig. 2 is a similar view, showing the Fig. 1 structure as it appears with the accessory unit unplugged from the socket which normally receives it. Fig. 3 is a side view of the Fig. 1 embodiment, while Figs. 4 and 5 are respectively a rear view and a plan view thereof. Fig. 6 shows a form of my invention wherein the light-sensitive tube and the flash tube form integral parts of a single unit; Fig. 6 is a side elevation view, Fig. 7 a front view of the same unit, and Fig. 9 is a detail view showing the universal mounting by which the light-sensitive tube and the flash tube are mechanically connected. Fig. 8 is a detail view bringing out the same structural features with respect to the Fig. 1 embodiment of the invention. Fig. 10 is a schematic diagram showing the electrical wiring of a typical embodiment of my invention.

As may be observed from Figs. 1–5, my invention incorporates a conventional electronic flash unit enclosed in a housing 10 and being provided with a flash tube 11 surrounded by a reflector 12. Devices of this type are well known and may be purchased commercially. They are normally equipped with a battery of several hundred volts output, indicated in Fig. 10 as element 13, and an off-on switch 14 for disconnecting the battery from the circuit when the unit is not in use.

Since devices of this kind are in general commercial use, and since my invention does not relate to the electrical circuits thereof, it is to be understood that the wiring diagram shown in Fig. 10 is offered herein merely for the sake of complete disclosure, and does not limit my invention to any particular electrical circuit.

Since flash units are normally actuated by an electrical switch carried within a camera and momentarily closed in synchronism with the operation of the camera shutter, flash units such as that enclosed in housing 10 are normally provided with a socket 15 having a pair of spring receptacles for receiving the prongs of a connector plug associated with a so-called "sync cord" 16, the other end of which is terminated in a plug adapted to be received in a socket on the camera. The sync cord and its plug 16a may be seen in Fig. 2.

In assembling the combination of the present invention, I provide, for use with a flash unit of the sort enclosed in housing 10, an accessory element mounted in a housing 17, such accessory unit having a light-sensitive trigger tube 18, such as a 1C21, surrounded by a light-focusing collector 19 mounted on and carried by the housing 17. A sensitivity control consisting of an adjustable resistor 20 is in the illustrated embodiment mounted in housing 17 with its external manual control extending upward behind reflector 19. As may be best seen from Fig. 8, the housing 17 carries on its bottom surface a ball 21 which is received within and cooperates with a socket 22 which, collectively, form a universal joint. The socket 22 is designed to grip the ball 21 snugly to provide a fairly tight frictional fit, permitting the relative positions of the housing 17 and the socket 22 to be changed by a simple manual operation but having sufficient friction to hold the parts in the position selected. As may be seen from Figs. 1, 3, and 4, this ball-and-socket mounting arrangement permits the housing 17 and its accompanying light-collector assembly to be rotated freely relative to the socket 22 and also to be tilted with respect thereto in any desired axis.

The lower end of socket 22 terminates in an electrical plug 23 provided with prongs adapted to be received within the receptacle 15 in housing 10.

A suitable electrical wiring arrangement for the accessory unit mounted in housing 17 is shown in the upper portion of Fig. 10. Receptacle 15 holds plug 23 in rigid position relatively to housing 10, and hence likewise results in socket 22 being fixed with respect to housing 10. The universal joint comprising ball 21 and socket 22, however, leaves the trigger unit 17 free to be swiveled.

The pair of wires extending from the interior of housing 17 and terminating in the prongs of plug 23 are not shown in the drawing but, it will be understood, are taken through the interior of ball 21 and pass into the interior of socket 22 and plug 23 via a small central aperture (not shown) in ball 21.

If one does not need the versatility achieved by having the basic flash unit usable either as a slave unit or as a camera-actuated unit, one may dispense with the plug-in construction shown in the Fig. 1 embodiment and may instead use a permanently joined arrangement of the sort shown in Figs. 6, 7, and 9. In that embodiment of the invention, the flash-tube portion of the apparatus, with its light-focusing reflector, is designated 51, while the light-sensitive trigger tube, together with the battery and other associated electrical apparatus, is carried within the lower housing 52. The housings 51 and 52 are joined by a ball-and-socket universal joint comprising ball 53 and socket 54. Wires running from one portion of the unit to the other may be carried through a central aperture in ball 53, just as with the Fig. 1 apparatus.

The electrical circuit used for the Fig. 6 embodiment may be like that shown in Fig. 10, except that, in such event, the plug 23 and socket 15 will be dispensed with, permanent connection being made instead as indicated in Fig. 10 by dotted lines.

The sensitivity control 20 and the off-on switch 14 may of course be retained in the Fig. 6 embodiment, and may be mounted within either housing 51 or housing 52 as the designer's requirements may dictate. Similarly, if desired, the flash tube and its reflector may be mounted within the lower housing 52 and the light-sensitive trigger tube and its light collector carried in the smaller upper housing 51, should such an arrangement be more convenient to the designer.

In the operation of my invention, the assembled unit may be placed in the position most desirable to the photographer from the point of view of lighting his subject, and the light-sensitive trigger tube, with its focusing collector, can then be swiveled to the position at which it will receive maximum illumination from the master flash produced by a unit operating from the shutter switch of the camera. In being thus oriented, the light-sensitive trigger tube not only picks up far more light from the master flash than would be possible with prior-art devices of this class, but is at the same time shielded from light reaching it from other directions. This is a very important new result of my invention; it permits operation of the slave unit out to distances of fifty to sixty feet from the master flash unit and prevents unscheduled and undesired flashing of the slave unit responsively to light from other flash units and light sources which may be intermittently illuminating the area around my invention. The universal freedom of relative movement between the trigger unit and the flash unit permits, incidentally, lighting not only from the sides of the subject but likewise from above or below it, as the operator may prefer, without to any degree reducing the efficiency or dependability of the slave flash unit.

While I have in the present specification described in considerable detail certain specific embodiments of my invention, it is to be understood that these embodiments are merely illustrative and that the scope of my invention is primarily to be determined from the appended claims.

I claim:

1. For use with a photographic flash unit of the capacitor-discharge type having a gaseous-discharge flash tube, a light-focusing reflector therefor, and a receptacle adapted to receive a plug-in electrical connector for connecting said flash unit in circuit with a shutter-synchronized camera switch, an accessory unit comprising a plug-in connector adapted to be received within said receptacle, a housing, a mechanical coupling having a pair of opposite ends, one of said ends being rigidly joined to said connector and the other of said ends being rigidly joined to said housing, said coupling comprising a swivel joint, a light-sensitive trigger tube carried by said housing, a light-focusing collector partially surrounding said tube, and electrical conductors mounted internally of said housing and coupling electrically connecting said tube to said connector.

2. An accessory unit for use with a photographic flash unit of the capacitor-discharge type having a receptacle adapted to receive a plug-in connector for connecting said flash unit in circuit with a shutter-synchronized camera switch, said accessory unit comprising a housing, a connector adapted to be received within said receptacle in lieu of said first-mentioned connector, a mechanical coupling joining said housing and said last-mentioned connector, said coupling comprising a swivel joint, a light-sensitive trigger tube carried by said housing, a light collector supported by said housing and partially surrounding said trigger tube, and electrical conductors connected in circuit with said trigger tube and said last-mentioned connector operative, when said last-mentioned connector is plugged into said receptacle, to place said trigger tube in circuit with said flash unit in lieu of said camera switch.

References Cited in the file of this patent

UNITED STATES PATENTS

| | | |
|---|---|---|
| 2,231,565 | DeReamer et al. | Feb. 11, 1941 |
| 2,336,633 | Parson | Dec. 14, 1943 |
| 2,508,242 | Stein | May 16, 1950 |
| 2,509,967 | Davis | May 30, 1950 |

FOREIGN PATENTS

| | | |
|---|---|---|
| 302,012 | Great Britain | Dec. 13, 1928 |